United States Patent
Park et al.

(10) Patent No.: US 9,461,321 B2
(45) Date of Patent: *Oct. 4, 2016

(54) METHOD FOR DIAGNOSING FAULT OF FUEL CELL STACK

(71) Applicant: Hyundai Autron Co., Ltd., Seongnam-si (KR)

(72) Inventors: Hyun-Seok Park, Gunpo-Si (KR); Uck-Soo Kim, Anyang-si (KR); Sun-Doo Kang, Yongin-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 208 days.

This patent is subject to a terminal disclaimer.

(21) Appl. No.: 14/134,936

(22) Filed: Dec. 19, 2013

(65) Prior Publication Data

US 2014/0176142 A1    Jun. 26, 2014

(30) Foreign Application Priority Data

Dec. 20, 2012   (KR) .................. 10-2012-0149947

(51) Int. Cl.
*G01N 27/416*   (2006.01)
*H01M 8/04*     (2016.01)
*H01M 8/10*     (2016.01)

(52) U.S. Cl.
CPC ..... *H01M 8/04679* (2013.01); *H01M 8/04559* (2013.01); *H01M 8/04649* (2013.01); *H01M 2008/1095* (2013.01); *Y02E 60/50* (2013.01)

(58) Field of Classification Search
USPC ........................................ 324/426
See application file for complete search history.

(56) References Cited

U.S. PATENT DOCUMENTS

| | | | | |
|---|---|---|---|---|
| 8,570,047 B1* | 10/2013 | Davies | .............. | H01M 10/4207 307/17 |
| 2002/0196025 A1* | 12/2002 | Freeman | ................ | G01R 27/02 324/426 |
| 2004/0091759 A1* | 5/2004 | Harrington | ........ | G01R 31/3662 429/431 |
| 2005/0118472 A1* | 6/2005 | Yang | ................... | B60L 11/1887 320/101 |
| 2010/0216043 A1* | 8/2010 | Gottmann | ......... | H01M 8/04552 429/432 |
| 2010/0266875 A1* | 10/2010 | Somogye | .................. | G05F 1/10 429/7 |
| 2011/0223505 A1* | 9/2011 | Ganapathy | ........ | H01M 8/04559 429/431 |

FOREIGN PATENT DOCUMENTS

| | | |
|---|---|---|
| JP | 2009-231197 A | 10/2009 |
| KR | 10-2004-0010528 A | 1/2004 |
| KR | 10-2004-0072249 A | 8/2004 |
| KR | 10-2007-0061301 A | 6/2007 |

* cited by examiner

Primary Examiner — Yalkew Fantu
(74) Attorney, Agent, or Firm — Morgan, Lewis & Bockius LLP (57) ABSTRACT

Disclosed herein is a method for diagnosing a fault of a fuel cell stack, the method including: applying a summed current obtained by summing first and second frequencies to the fuel cell stack; diagnosing whether or not a fault has been generated in the fuel cell stack using a higher frequency of first and second frequencies of output voltages of the fuel cell stack; and reconfirming whether or not the fault has been generated in the fuel cell stack using the first and second frequencies in the output voltage of the fuel cell stack.

13 Claims, 5 Drawing Sheets

METHOD FOR DIAGNOSING FAULT OF FUEL CELL STACK

CROSS REFERENCE TO RELATED APPLICATION

This application claims the benefit of Korean Patent Application No. 10-2012-0149947, filed on Dec. 20, 2012, which is hereby incorporated by reference in its entirety into this application.

BACKGROUND OF THE INVENTION

1. Technical Field

Exemplary embodiments of the present invention relate to a method for diagnosing a fault of a fuel cell stack.

2. Description of the Related Art

A fuel cell is a kind of power generating device that does not convert chemical energy of a fuel into heat by combustion, but converts the chemical energy into electrical energy by an electrochemical reaction in a stack and may be used to supply power to a small electric/electrical product, particularly, a portable apparatus as well as supply industrial power, home power, and power for driving a vehicle.

As a power supply for driving the vehicle, a polymer electrolyte membrane fuel cell (PEMFC) (proton exchange membrane fuel cell) having the highest power density among fuel cells has been currently studied mainly. The polymer electrolyte membrane fuel cell has a rapid start time due to a low operation temperature and a rapid power conversion reacting time.

The polymer electrolyte membrane fuel cell is configured to include a membrane electrode assembly (MEA) in which catalyst electrode layers in which an electrochemical reaction occur are attached to both sides of a solid polymer electrolyte membrane through which hydrogen ions move, a gas diffusion layer (GLD) serving to uniformly distribute reaction gases and transfer generated electrical energy, a gasket and coupling mechanism maintaining air-tightness of the reaction gases and coolant and appropriate coupling pressure, and a bipolar plate moving the reaction gases and the coolant.

When a fuel cell stack is assembled using the configuration of a unit cell as described above, a combination of the membrane electrode assembly and the gas diffusion layer, which are main components, is positioned in the innermost portion of the cell, the membrane electrode assembly includes the catalyst electrode layers, that is, an anode and a cathode, formed on both surfaces of the polymer electrolyte membrane and having catalysts applied thereto so that oxygen and hydrogen may react to each other, and the gas diffusion layer, the gasket, and the like, are stacked on outer sides of the anode and the cathode.

The bipolar plate provided with a flow field supplying the reaction gases (hydrogen, which is a fuel, and oxygen or air, which is an oxidizer) and passing the coolant therethrough is positioned at an outer side of the gas diffusion layer.

After a plurality of unit cells each having the above-mentioned configuration are stacked, a current collector, an insulating plate, and end plates supporting the stacked unit cells are coupled to the outermost portion. The unit cells are repeatedly stacked and coupled to each other between the end plates to configure the fuel cell stack.

In order to obtain potential actually required in the vehicle, the unit cells should be stacked by the required potential, and a product formed by stacking the unit cells is called a stack. Potential generated by one unit cell is about 1.3V. Therefore, a plurality of cells are stacked in series with each other in order to generate power required for driving the vehicle.

Meanwhile, in a fuel cell vehicle, a voltage of a cell is used to detect performance, an operation state, a fault, and the like, of a stack, and is used for various controls of a system such as a flow rate control of reaction gas. Typically, the bipolar plate is connected to a cell voltage monitoring apparatus through a connector and a conducting wire to monitor the voltage of the cell.

A cell voltage monitoring (CVM) apparatus according to the related art, which directly monitors voltages of all cells or two cells in the stack, uses a scheme in which a main controller (host controller) collecting voltages of all cells integrates and processes monitoring information and a voltage drop generated due to a fault result rather than a fault cause is monitored.

The cell voltage monitoring apparatus as described above has also been used to monitor a battery. Since the cell voltage monitoring apparatus according to the related art directly monitors the voltages of the cells, a position of a fault cell may be monitored. However, since the cell voltage monitoring apparatus according to the related art has a very complicated circuit configuration, it may be difficult to assemble and maintain the cell voltage monitoring apparatus according to the related art. In addition, the cell voltage monitoring apparatus according to the related art is expensive and may not detect a fault cause of the stack.

Further, an electrochemical impedance spectroscopy (EIS) has been used as the related art. The EIS is mainly used to detect an electrode reaction or a feature of a complex in an electrochemical field. The EIS may obtain general information on a nature, a structure, and a reaction of the complex by analyzing a system response and has also been used as a very useful tool in an applied chemistry field, a medical engineering field, a bioengineering field, or the like.

However, the EIS, which is for an off-line, requires a long test time, may not perform real-time monitoring, is expensive, and may be used only for testing a unit cell.

SUMMARY OF THE INVENTION

An object of the present invention is to provide a method for diagnosing a fault of a fuel cell stack capable of diagnosing early the fault of the fuel cell stack by applying a summed current to the fuel cell stack and then diagnosing the fault of the fuel cell stack using a voltage at a point in time at which one period of a first frequency ends when one period of the first frequency in output voltages of the fuel cell stack ends before one period of a second frequency in the output voltages.

Another object of the present invention is to provide a method for diagnosing a fault of a fuel cell stack capable of accurately diagnosing the fault of the fuel cell stack by diagnosing the fault of the fuel cell stack using a higher frequency in output voltages of the fuel cell stack and then again diagnosing the fault of the fuel cell stack using first and second frequencies when one period of a later frequency in the first and second frequencies ends.

Objects to be solved by the present invention are not limited to the above-mentioned objects, and other objects that are not mentioned may be clearly understood by those skilled in the art in the following description.

According to an exemplary embodiment of the present invention, there is provided a method for diagnosing a fault of a fuel cell stack performed by an apparatus for diagnosing a fault of a fuel cell stack, the method including: applying a summed current obtained by summing first and second frequencies to the fuel cell stack; comparing periods of the first and second frequencies of output voltages of the fuel cell stack with each other to select any one of the first and second frequencies; and diagnosing whether or not a fault has been generated in the fuel cell stack using a voltage corresponding to the selected frequency.

Each of the first and second frequencies may be a frequency used to calculate at least one of a total harmonic distortion (THD) and an impedance.

A period of the first frequency may be shorter than that of the second frequency.

The comparing of the periods of the first and second frequencies of the output voltages of the fuel cell stack with each other to select any one of the first and second frequencies may include selecting a frequency of which one period ends earlier in the first and second frequencies.

The diagnosing of whether or not the fault has been generated in the fuel cell stack may include diagnosing whether or not the fault has been generated in the fuel cell stack using the first frequency when one period of the first frequency of the output voltages of the fuel cell stack ends before one period of the second frequency of the output voltages.

The diagnosing of whether or not the fault has been generated in the fuel cell stack may include diagnosing that an electrolyte membrane of the fuel cell stack is in a dry state when an impedance value calculated at a point in time at which one period of the first frequency of the output voltages of the fuel cell stack ends earlier is a specific impedance or more.

The method may further include reconfirming whether or not the fault has been generated in the fuel cell stack using the first and second frequencies when one period of a later frequency in the first and second frequencies of the output voltages of the fuel cell stack ends.

The reconfirming of whether or not the fault has been generated in the fuel cell stack may include passing a voltage corresponding to at least one of the first and second frequencies of the output voltages of the fuel cell stack through a plurality of filters, wherein the plurality of filters include at least one of a band pass filter passing only a specific frequency therethrough and a high pass filter passing a specific frequency to a frequency of the specific frequency or more therethrough.

The passing of the voltage corresponding to at least one of the first and second frequencies of the output voltages of the fuel cell stack through the plurality of filters may include: passing a voltage corresponding to at least one of the first and second frequencies through the high pass filter to extract a basic wave frequency to a harmonic frequency; and passing a voltage corresponding to at least one of the first and second frequencies through the band pass filter to extract a specific frequency.

The reconfirming of whether or not the fault has been generated in the fuel cell stack may include diagnosing whether or not the fault has been generated in the fuel cell stack depending on a ratio of the harmonic frequency to the basic wave frequency extracted by the high pass filter.

The reconfirming of whether or not the fault has been generated in the fuel cell stack may include diagnosing that the fault has been generated in the fuel cell stack when the ratio of the harmonic frequency to the basic wave frequency is a specific ratio or more.

The reconfirming of whether or not the fault has been generated in the fuel cell stack may include diagnosing a wetting state of the fuel cell stack using an impedance for the specific frequency extracted by the band pass filter.

The reconfirming of whether or not the fault has been generated in the fuel cell stack may include diagnosing that an electrolyte membrane of the fuel cell stack is in a dry state when the impedance for the specific frequency is a specific impedance or more.

The reconfirming of whether or not the fault has been generated in the fuel cell stack may include diagnosing that an electrolyte membrane of the fuel cell stack is in a wet state when the impedance for the specific frequency is a specific impedance or less.

Details of other exemplary embodiments are included in the detailed description and the accompanying drawings of the present invention.

Advantages and/or features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Throughout the description, like reference numerals denote like elements.

DESCRIPTION OF THE EXEMPLARY EMBODIMENTS

Hereinafter, exemplary embodiments of the present invention will be described in detail with reference to the accompanying drawings.

Figure 1:
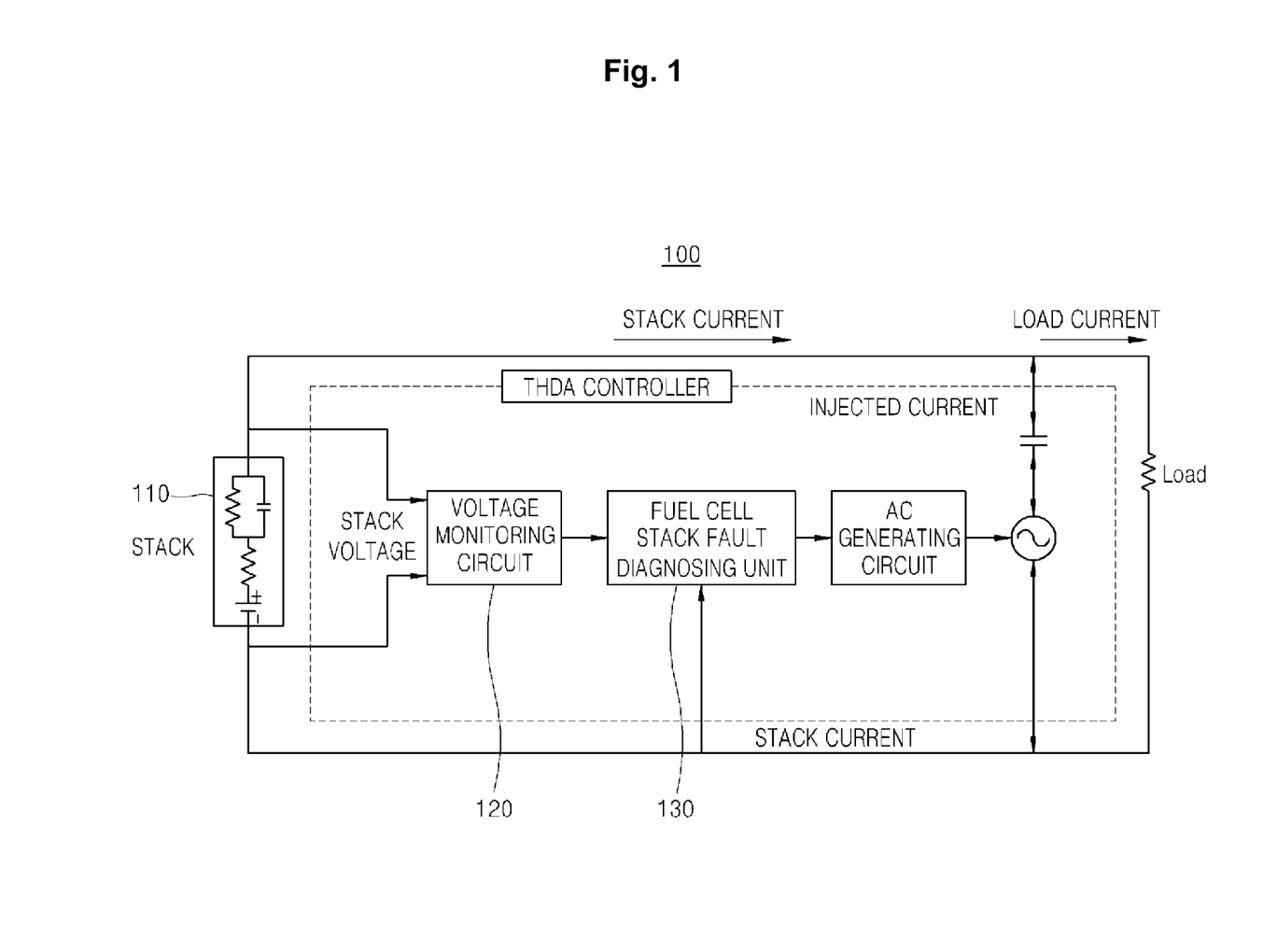
FIG. 1 is a diagram illustrating a connection state of an apparatus for diagnosing a fault of a fuel cell stack for performing a process of diagnosing a fault of a fuel cell stack according to an exemplary embodiment of the present invention.
Figure 2:
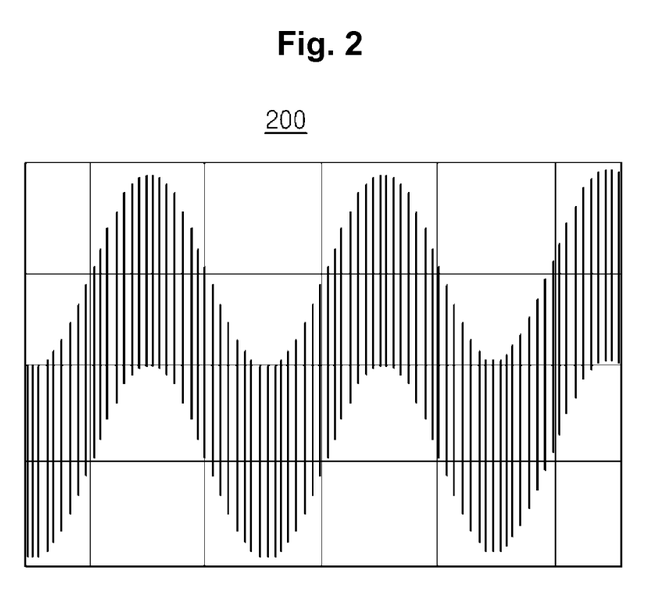
FIG. 2 is a graph illustrating a frequency of a summed current applied to the fuel cell stack.

FIG. 1 is a diagram illustrating a connection state of an apparatus for diagnosing a fault of a fuel cell stack for performing a process of diagnosing a fault of a fuel cell stack according to an exemplary embodiment of the present invention; FIG. 2 is a graph illustrating a frequency of a summed current applied to the fuel cell stack; and FIG. 3 is a graph illustrating a frequency for diagnosing the fault of the fuel cell stack.

Figure 3:
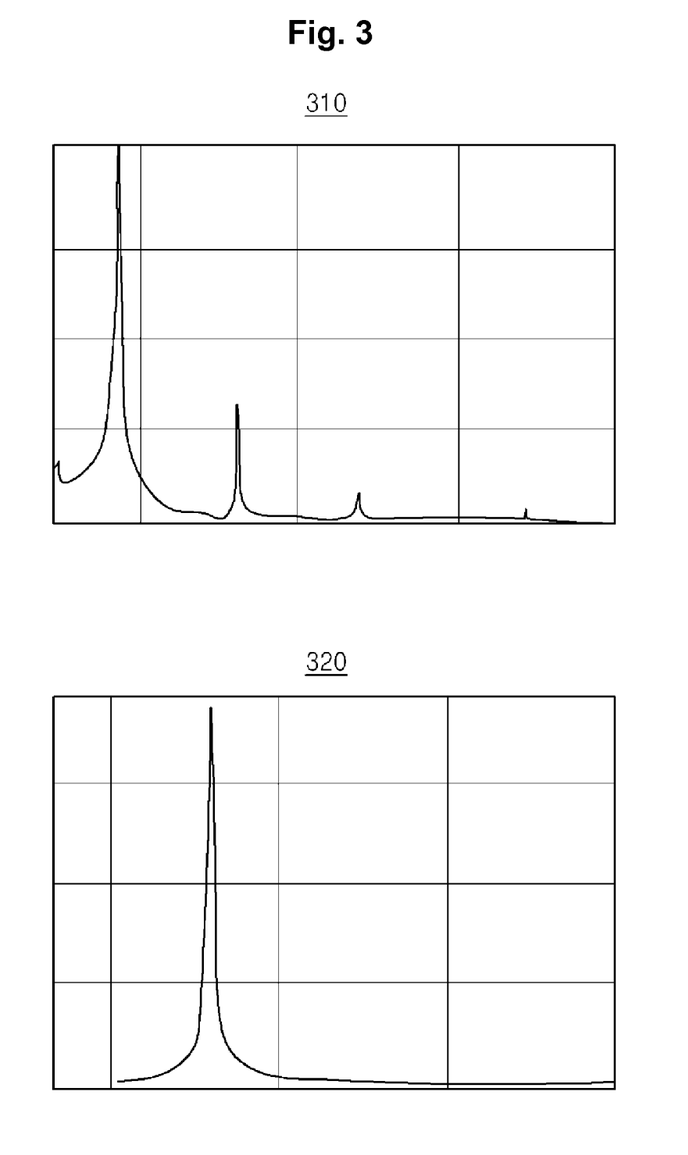
FIG. 3 is a graph illustrating a frequency for diagnosing the fault of the fuel cell stack.

Referring to FIGS. 1 to 3, an apparatus 100 for diagnosing a fault of a fuel cell stack is configured to include a fuel cell stack 110, a voltage monitoring circuit 120, and a fuel cell stack fault diagnosing unit 130.

The fuel cell stack 110 may be configured by continuously arranging a plurality of unit cells, and a diagnosis may start when a summed current obtained by summing currents of first and second frequencies is applied to the fuel cell stack 110.

The voltage monitoring circuit 120 monitors output voltages of the fuel cell stack 110 and provides the monitored output voltages to the fuel cell stack fault diagnosing unit 130.

In the exemplary embodiment of the present invention, the voltage monitoring circuit 120 may monitor a voltage corresponding to a frequency of which one period ends earlier in first and second frequencies corresponding to the output voltages of the fuel cell stack 110 and provide the monitored voltage to the fuel cell stack fault diagnosing unit 130.

In another exemplary embodiment of the present invention, the voltage monitoring circuit 120 may monitor a voltage when one period of a later frequency in the first and second frequencies corresponding to the output voltages of the fuel cell stack 110 ends and provide the monitored voltage to the fuel cell stack fault diagnosing unit 130.

The fuel cell stack fault diagnosing unit 130 diagnoses a fault of the fuel cell stack using at least one of the first and second frequencies corresponding to the output voltages of the fuel cell stack 110 and monitored by the voltage monitoring circuit 120. Here, each of the first and second frequencies may be a frequency used to calculate at least one of a total harmonic distortion (THD) and an impedance.

In the exemplary embodiment of the present invention, the fuel cell stack fault diagnosing unit 130 may diagnose whether or not the fault has been generated in the fuel cell stack using a voltage corresponding to any one frequency in the output voltages of the fuel cell stack. In the exemplary embodiment of the present invention, the fuel cell stack fault diagnosing unit 130 may diagnose whether or not the fault has been generated in the fuel cell stack using a frequency of which one period ends earlier in the first and second frequencies corresponding to the output voltages of the fuel cell stack.

For example, in the case in the first frequency is 3 Hz and the second frequency is 1 Hz, a period of the first frequency ends three times before one period of the second frequency ends. However, the fuel cell stack fault diagnosing unit 130 may diagnose whether or not the fault has been generated in the fuel cell stack using a voltage at a point in time at which one period of the first frequency ends.

Therefore, the fault of the fuel cell stack is diagnosed using the voltage at a point in time at which one period of the first frequency ends when one period of the first frequency in the output voltages of the fuel cell stack ends before one period of the second frequency in the output voltages, such that the fault of the fuel cell stack may be diagnosed early.

In another exemplary embodiment of the present invention, the fuel cell stack fault diagnosing unit 130 may diagnose whether or not the fault has been generated in the fuel cell stack using the first and second frequencies in the output voltages of the fuel cell stack. In the exemplary embodiment of the present invention, the fuel cell stack fault diagnosing unit 130 may diagnose whether or not the fault has been generated in the fuel cell stack using the first and second frequencies when one period of a later frequency in the first and second frequencies corresponding to the output voltages of the fuel cell stack ends.

Figure 5:
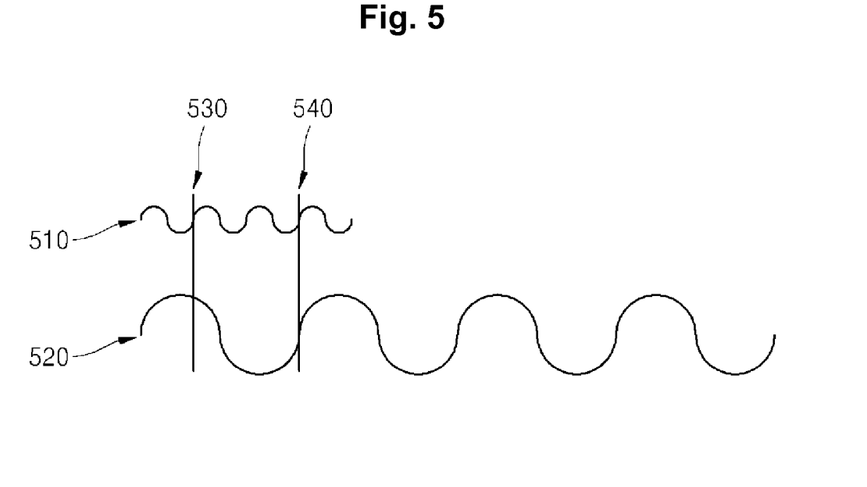
FIG. 5 is a diagram for describing an execution process of FIG. 4.

For example, in the case in which the first frequency is 3 Hz and the second frequency is 1 Hz, a period of the first frequency ends three times before one period of the second frequency ends. However, the fuel cell stack fault diagnosing unit 130 may diagnose whether or not the fault has been generated in the fuel cell stack using the first and second frequencies 510 and 520 when one period of a later frequency 520 in the first and second frequencies 510 and 520 corresponding to the output voltages of the fuel cell stack ends (540).

The fuel cell stack fault diagnosing unit 130 may diagnose whether or not the fault has been generated in the fuel cell stack using a voltage corresponding to a specific voltage.

In the exemplary embodiment of the present invention, the fuel cell stack fault diagnosing unit 130 may diagnose whether or not the fault has been generated in the fuel cell stack by comparing a voltage corresponding to the first frequency with a specific voltage. For example, in the case in which one period of the first frequency ends before one period of the second frequency, the fuel cell stack fault diagnosing unit 130 may diagnose whether or not the fault has been generated in the fuel cell stack by comparing the voltage corresponding to the first frequency with the specific voltage.

In the exemplary embodiment of the present invention, the fuel cell stack fault diagnosing unit 130 may diagnose that an electrolyte membrane of the fuel cell stack is in a dry state when an impedance value calculated at a point in time at which one period of the first frequency ends earlier is a specific impedance or more. In another exemplary embodiment of the present invention, the fuel cell stack fault diagnosing unit 130 may diagnose that an electrolyte membrane of the fuel cell stack is in a wet state when an impedance value calculated at a point in time at which one period of the first frequency ends earlier is a specific impedance or less.

In another exemplary embodiment of the present invention, the fuel cell stack fault diagnosing unit 130 may diagnose whether or not the fault has been generated in the fuel cell stack by comparing a voltage corresponding to the first frequency and a voltage corresponding to the second frequency with a specific voltage. The fuel cell stack fault diagnosing unit 130 may diagnose the fault of the fuel cell stack using diagnosis data obtained by passing at least one of the voltage corresponding to the first frequency and the voltage corresponding to the second frequency through a first frequency filter (not illustrated) and a second frequency filter (not illustrated), respectively. In order to perform this operation, a connection structure of FIG. 1 may be changed. Hereinafter, a process in which the apparatus 100 for diagnosing a fault of a fuel cell stack filters at least one of the voltage corresponding to the first frequency and the voltage corresponding to the second frequency to extract the diagnosis data and diagnose the fault of the fuel cell stack will be described.

The first frequency filter may receive at least one of the voltage corresponding to the first frequency and the voltage corresponding to the second frequency and extract a specific frequency to a frequency of the specific frequency or more as the diagnosis data. The first frequency filter may provide the diagnosis data to the fuel cell stack fault diagnosing unit 130.

In the exemplary embodiment of the present invention, the first frequency filter may receive at least one of the voltage corresponding to the first frequency and the voltage corresponding to the second frequency and pass a basic wave frequency to a harmonic frequency used to calculate a THD through to extract the diagnosis data. For example, the first frequency filter may extract at least one of the voltage corresponding to the first frequency and the voltage corresponding to the second frequency to a frequency of 10 Hz or more. In the exemplary embodiment of the present invention, the first frequency filter may include a high pass filter (HPF).

The second frequency filter may receive at least one of the voltage corresponding to the first frequency and the voltage corresponding to the second frequency and extract a specific frequency as the diagnosis data. The second frequency filter may provide the diagnosis data to the fuel cell stack fault diagnosing unit 130.

In the exemplary embodiment of the present invention, the second frequency filter may receive at least one of the voltage corresponding to the first frequency and the voltage corresponding to the second frequency and pass a specific frequency used to calculate an impedance therethrough to extract the diagnosis data. For example, the second frequency filter may extract a frequency of 300 Hz. In the exemplary embodiment of the present invention, the second frequency filter may include a band pass filter (BPF).

The fuel cell stack fault diagnosing unit 130 diagnoses the fault of the fuel cell stack 110 using the diagnose data received from each of the first and second frequency filters.

In the exemplary embodiment of the present invention, the fuel cell stack fault diagnosing unit may calculate a THD using the specific frequency to the frequency of the specific frequency or more received as the diagnosis data from the first frequency filter and diagnose the fault of the fuel cell stack 110 using the THD. For example, the fuel cell stack fault diagnosing unit may receive the basic wave frequency to the harmonic frequency from the first frequency filter and diagnose the fault of the fuel cell stack 110 using a ratio of the harmonic frequency to the basic wave frequency. The fuel cell stack fault diagnosing unit may diagnose that the fault has been generated in the fuel cell stack 110 when the ratio of the harmonic frequency to the basic wave frequency is a specific ratio or more.

In another exemplary embodiment of the present invention, the fuel cell stack fault diagnosing unit may diagnose a wetting state of the fuel cell stack 110 using the impedance of the specific frequency received as the diagnosis data from the second frequency filter. As an example, the fuel cell stack fault diagnosing unit may diagnose that an electrolyte membrane of the fuel cell stack 110 is in a dry state when the impedance of the specific frequency received from the second frequency filter is a specific impedance or more. As another example, the fuel cell stack fault diagnosing unit may diagnose that an electrolyte membrane of the fuel cell stack 110 is in a wet state when the impedance of the specific frequency received from the second frequency filter is a specific impedance or less.

Figure 4:
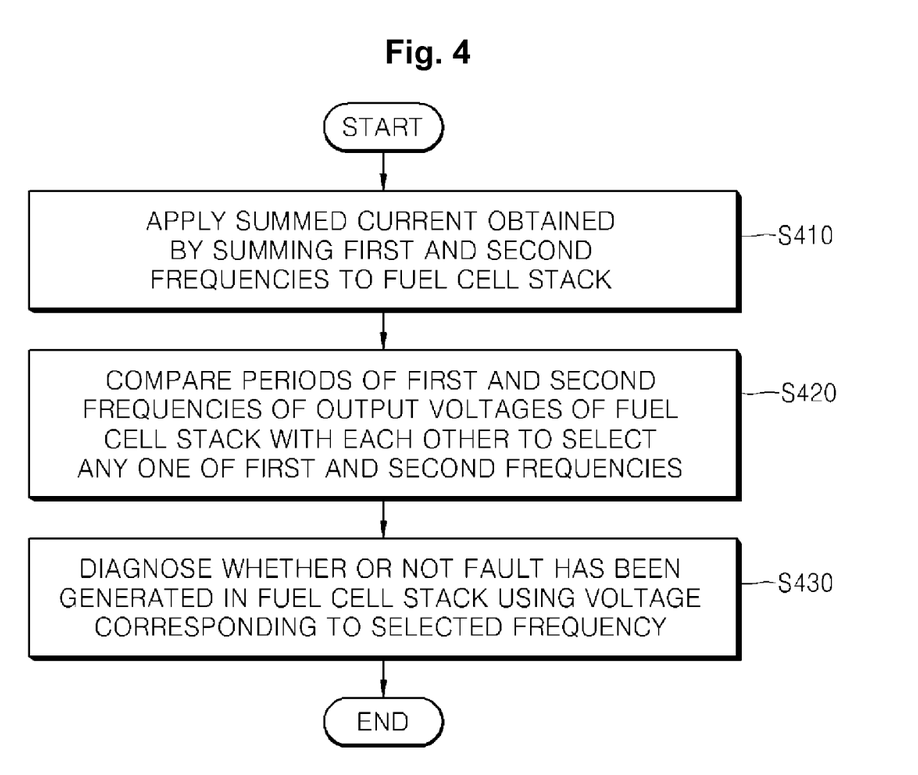
FIG. 4 is a flow chart for describing an example of a method for diagnosing a fault of a fuel cell stack according to an exemplary embodiment of the present invention.

FIG. 4 is a flow chart for describing an example of a method for diagnosing a fault of a fuel cell stack according to an exemplary embodiment of the present invention; and FIG. 5 is a diagram for describing an execution process of FIG. 4.

Referring to FIGS. 4 and 5, the apparatus 100 for diagnosing a fault of a fuel cell stack applies a summed current obtained by summing first and second frequencies 510 and 520 to the fuel cell stack (S410). Then, the apparatus 100 for diagnosing a fault of a fuel cell stack compares periods of the first and second frequencies 510 and 520 in output voltages of the fuel cell stack with each other to select any one of the first and second frequencies 510 and 520 (S420). Next, the apparatus 100 for diagnosing a fuel cell stack diagnoses whether or not a fault has been generated in the fuel cell stack using a voltage corresponding to the selected frequency (S430).

In an example of S420, the apparatus 100 for diagnosing a fuel cell stack may select the first frequency 510 of which one period ends earlier in the first and second frequencies 510 and 520 corresponding to the output voltages of the fuel cell stack. In an example of S430, the apparatus 100 for diagnosing a fuel cell stack may diagnose whether or not the fault has been generated in the fuel cell stack using a voltage at a point in time 530 at which one period of the first frequency 510 in the first and second frequencies 510 and 520 ends. Although not illustrated in FIG. 4, the apparatus 100 for diagnosing a fuel cell stack may diagnose whether or not the fault has been generated in the fuel cell stack using the first and second frequencies when one period of a later frequency in the first and second frequencies corresponding to the output voltages of the fuel cell stack ends.

According to the exemplary embodiment of the present invention, it is possible to diagnose early the fault of the fuel cell stack by applying the summed current to the fuel cell stack and then diagnosing the fault of the fuel cell stack using a voltage at a point in time at which one period of the first frequency ends when one period of the first frequency in the output voltages of the fuel cell stack ends before one period of the second frequency in the output voltages.

According to the exemplary embodiment of the present invention, it is possible to accurately diagnose the fault of the fuel cell stack by diagnosing the fault of the fuel cell stack using a higher frequency in the output voltages of the fuel cell stack and then again diagnosing the fault of the fuel cell stack using first and second frequencies when one period of a later frequency in the first and second frequencies ends.

Hereinabove, although specific exemplary embodiments of the present invention have been described, various modifications may be made without departing from the scope of the present invention. Accordingly, the scope of the present invention is not construed as being limited to the described exemplary embodiments, but should be defined by the following claims as well as equivalents thereof.

Although the present invention has been described with reference to the exemplary embodiments and the accompanying drawings, it is not limited to the above-mentioned exemplary embodiments, but may be variously modified and altered from the above description by those skilled in the art to which the present invention pertains. Therefore, the scope and spirit of the present invention should be understood only by the following claims, and all of the equivalences and equivalent modifications of the claims should be intended to fall within the scope and spirit of the present invention.

What is claimed is:

1. A method for diagnosing a fault of a fuel cell stack performed by an apparatus for diagnosing a fault of a fuel cell stack, the method comprising:
    applying a summed current obtained by summing first and second frequencies to the fuel cell stack;
    comparing periods of the first and second frequencies of output voltages of the fuel cell stack with each other to select any one of the first and second frequencies; and
    diagnosing whether or not a fault has been generated in the fuel cell stack using a voltage at a point in time at which one period of the selected frequency ends,
    wherein a period of the first frequency is shorter than a period of the second frequency.

2. The method of claim 1, wherein each of the first and second frequencies is a frequency used to calculate at least one of a total harmonic distortion (THD) and an impedance.

3. The method of claim 1, wherein the comparing of the periods of the first and second frequencies of the output voltages of the fuel cell stack with each other to select any one of the first and second frequencies includes selecting a frequency of which one period ends earlier in the first and second frequencies.

4. The method of claim 2, wherein the diagnosing of whether or not the fault has been generated in the fuel cell stack includes diagnosing whether or not the fault has been generated in the fuel cell stack using the first frequency when one period of the first frequency of the output voltages of the fuel cell stack ends before one period of the second frequency of the output voltages.

5. The method of claim 4, wherein the diagnosing of whether or not the fault has been generated in the fuel cell stack includes diagnosing that an electrolyte membrane of the fuel cell stack is in a dry state when an impedance value calculated at a point in time at which one period of the first frequency of the output voltages of the fuel cell stack ends earlier is a specific impedance or more.

6. The method of claim 2, further comprising reconfirming whether or not the fault has been generated in the fuel cell stack using the first and second frequencies when one period of a later frequency in the first and second frequencies of the output voltages of the fuel cell stack ends.

7. The method of claim 6, wherein the reconfirming of whether or not the fault has been generated in the fuel cell stack includes passing a voltage corresponding to at least one of the first and second frequencies of the output voltages of the fuel cell stack through a plurality of filters, the plurality of filters including at least one of a band pass filter passing only a specific frequency therethrough and a high pass filter passing a specific frequency to a frequency of the specific frequency or more therethrough.

8. The method of claim 7, wherein the passing of the voltage corresponding to at least one of the first and second frequencies of the output voltages of the fuel cell stack through the plurality of filters includes:

passing a voltage corresponding to at least one of the first and second frequencies through the high pass filter to extract a basic wave frequency to a harmonic frequency; and passing a voltage corresponding to at least one of the first and second frequencies through the band pass filter to extract a specific frequency.

9. The method of claim 8, wherein the reconfirming of whether or not the fault has been generated in the fuel cell stack includes diagnosing whether or not the fault has been generated in the fuel cell stack depending on a ratio of the harmonic frequency to the basic wave frequency extracted by the high pass filter.

10. The method of claim 9, wherein the reconfirming of whether or not the fault has been generated in the fuel cell stack includes diagnosing that the fault has been generated in the fuel cell stack when the ratio of the harmonic frequency to the basic wave frequency is a specific ratio or more.

11. The method of claim 8, wherein the reconfirming of whether or not the fault has been generated in the fuel cell stack includes diagnosing a wetting state of the fuel cell stack using an impedance for the specific frequency extracted by the band pass filter.

12. The method of claim 11, wherein the reconfirming of whether or not the fault has been generated in the fuel cell stack includes diagnosing that an electrolyte membrane of the fuel cell stack is in a dry state when the impedance for the specific frequency is a specific impedance or more.

13. The method of claim 12, wherein the reconfirming of whether or not the fault has been generated in the fuel cell stack includes diagnosing that an electrolyte membrane of the fuel cell stack is in a wet state when the impedance for the specific frequency is a specific impedance or less.

* * * * *